Nov. 4, 1969   J. R. BENFORD   3,476,462
LOW POWER MICROSCOPE SEMI-OBJECTIVE WITH FIELD FLATTENING LENS
Filed April 21, 1967
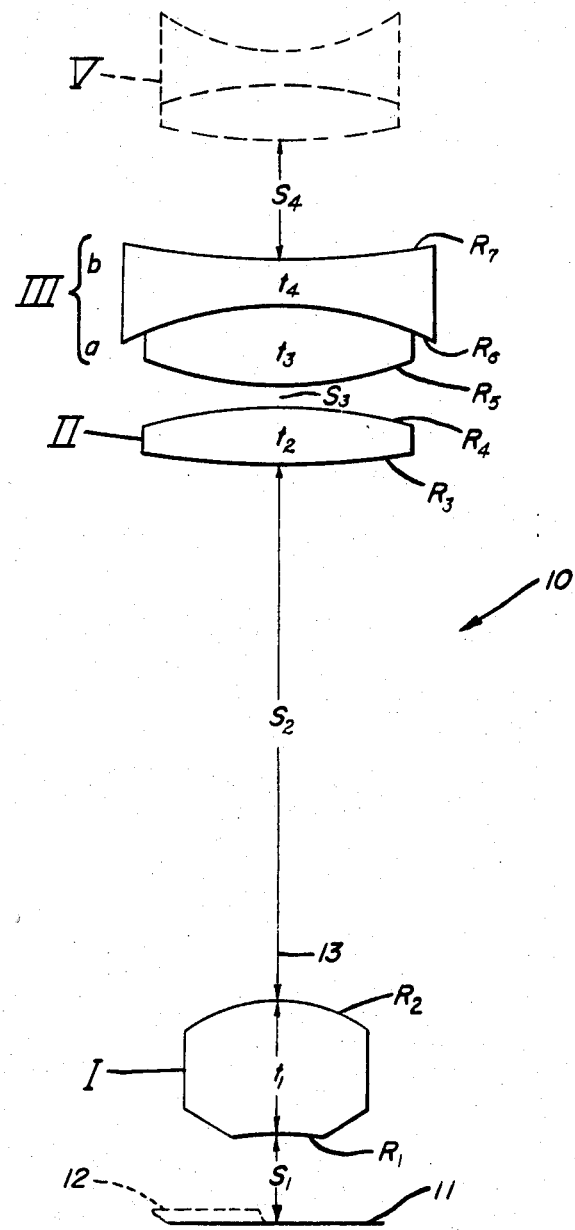
TOTAL MAGNIFICATION = 10.0 X
N. A. = 0.25
JAMES R. BENFORD
INVENTOR.
BY Frank C. Parker
ATTORNEY

United States Patent Office 3,476,462
Patented Nov. 4, 1969

3,476,462
LOW POWER MICROSCOPE SEMI-OBJECTIVE WITH FIELD FLATTENING LENS
James R. Benford, Irondequoit, N.Y., assignor to Bausch & Lomb Incorporated, Rochester, N.Y., a corporation of New York
Filed Apr. 21, 1967, Ser. No. 632,806
Int. Cl. G02b 9/34
U.S. Cl. 350—177                            6 Claims

ABSTRACT OF THE DISCLOSURE

A microscope semi-objective having 2× magnification per se which is designed for use with an associated negative field flattening lens having substantially 5× magnification to produce cooperatively a total magnification of substantially 10× and a numerical aperture of substantially 0.25, said semi-objective being one of a set of such semi-objectives of different powers which are used interchangeably with the field flattening lens.

BACKGROUND OF THE INVENTION

A semi-objective of the kind herein set forth is used in cooperative association with a plurality of other related semi-objectives in a microscope rotatable nosepiece, the individual semi-objectives having different respective magnifications covering a large range of image magnification, each semi-objective being corrected aberrationwise together with a single stationary negative corrector lens to produce the best practical overall correction of imaging aberrations.

Such a semi-objective is not known of in the prior art, but related art is represented by several patent applications listed herebelow; Ser. No. 408,875 filed by H. E. Rosenberger, No. 4, 1964, now abandoned in favor of continuation application Ser. No. 732,485, and Ser. No. 482,444 filed by D. E. Judd, Aug. 25, 1965, and now Patent No. 3,399,017, issued Aug. 27, 1968, these applications being assigned to the same assignee as in the present application.

The closest art known is 3,262,363 issued to Ziegler on July 26, 1966 which shows a micro-objective comprised of three lens members which resemble in optical form to some degree the semi-objective portion of the present invention but the performance of Ziegler's micro-objective is somewhat inferior to the present invention, since it lacks the field-flattening possibilities inherent in the negative field-flattening lens of the present invention.

SUMMARY OF THE INVENTION

The present invention relates to microscope optical systems and more particularly it relates to improvements in the objective lens system thereof.

It is an object of the present invention to provide a novel objective lens system of substantially 10× magnification and 0.25 numerical aperture for a microscope, said system being formed cooperatively by a semi-objective having substantially 2.0× magnification and a negative field flattening and aberration correction lens having 5× magnification.

It is a further object of the present invention to provide such an objective lens system which forms a well-corrected image with regard to chromatic and monochromatic aberrations as well as an excellent flat field, the construction thereof being economical compared to micro-objectives of a comparable grade.

Further objects and advantages will be apparent in the arrangement of parts and construction of details in the following specification together with the accompanying drawing.

DESCRIPTION OF THE DRAWING

The single figure in the drawing is an optical diagram showing a preferred form of the present invention.

DESCRIPTION OF PREFERRED EMBODIMENT

In the preferred embodiment of the present invention there is provided a semi-objective which is generally designated by the numeral 10 and it comprises a front positive meniscus singlet lens member which is designated I and is concave toward the object or specimen surface. Lens member I is spaced rearwardly of an object surface 11 at an axial distance which is designated $S_1$ extending between the concave front surface of lens I and the aforesaid object surface 11.

Rearwardly of the meniscus lens I in optical alignment therewith along an optical axis 13 is arranged a double convex singlet lens member II which is spaced from lens member I at an axial distance designated $S_2$. Rearwardly of the lens member II, by an axial distance $S_3$ is provided a meniscus formed doublet lens member which is designated III and includes therein a front double convex lens element IIIa which lies in full surface contact with a rear double concave lens element IIIb.

The outstanding characteristic of the present invention relates to the provision of a negative field flattening lens member V which is spaced at an axial distance designated $S_4$ rearwardly from the doublet lens III, the purpose thereof being described hereinafter. Preferably, the lens member V is constructed as a meniscus lens which is concave toward the rear end and is made of two lens elements which are so chosen as to serve an acromatizing function.

The axial lens thickness on the optical axis 13 pertaining to the successive lens members I, II, III are designated by $t_1$ to $t_4$, the rear most designation belonging to the lens element IIIb.

As heretofore indicated, the optical equipment of the microscope wherein the semi-objective is used includes a plurality of semi-objectives of different power or magnifications which are mounted in a rotatable nosepiece so that individually these semi-objectives may be aligned with the aforesaid stationary negative field flattening lens member V on the optical axis 13 of the microscope. It is important that each one of said plurality of semi-objectives be designed optically in detail with careful regard for the total aberration correcting properties to be obtained when combined with the negative lens member V. Every semi-objective is parfocalized with reference to all the other semi-objectives in the set.

As far as the complete optical system is concerned, the improvements and advantages mentioned herebelow are provided.

(1) The secondary spectrum of the image produced by the semi-objective 10 together with the negative corrector lens V is improved.

(2) The Petzval condition of the system is improved due to the balancing contribution of the negative focal length of the corrector lens taken together with the beneficial effect of the rear-most lens surface of lens III as well as the foremost surface on lens I.

(3) Coma condition of the image is improved.

(4) The lateral color aberration is decidedly improved.

(5) Astigmatism is compensated in a helpful way.

(6) The most important effect contributed by the field flattening lens V is the very pronounced flattening of the field which is due very largely to the increased focal length of the optical system.

(7) A further benefit for a microscope optical system which uses such a field flattening lens member V is that the individual lens elements of the semi-objective 10 itself may be simplified and the curvatures of the refractive surfaces may be flattened which results in less costly manufacturing procedures. All of these advantages are gained without impairment of a favorable value for the numerical aperture.

As mentioned above, the total image magnification of the semi-objective 10 together with the negative corrector lens V is 10×, the magnification of said corrector lens being 5× per se. Therefore, the magnification of the semi-objective 10 per se is substantially 2×.

According to the present invention, the parameter values or constructional data which describe the semi-objective 10 are arrived at by careful calculation and experiment and are set forth in Table I herebelow.

The values in Table I are given in ranges of values which include a median, nominal or ideal value for each parameter for manufacturing and commercial reasons mentioned herebelow. It is well known in the lens making art that it is practically impossible to manufacture a production run of lens elements economically while maintaining all of the lens parameters at specific nominal or ideal values. Therefore the lens designer specifies small tolerances or a range of values for each parameter within which the lens elements may be manufactured economically and relatively quickly while maintaining acceptable optical quality and this practice when applied to all of the lens parameters permits an objective 10 to be assembled which is capable of good optical performance in all cases and this procedure is in common use. The technique used by the manufacturer is to separate out and classify the lens elements which fall within the said ranges of values and then to selectively assemble from these elements a complete semi-objective 10, said lens elements being chosen to compensate each other aberrationwise as far as possible. Such a technique is highly successful in producing at least cost a good semi-objective as far as optical requirements are concerned.

In the aforementioned Table I, there are given, in terms of F, the equivalent focal lengths $F(I)$, $F(II)$ and $F(III)$ which are related to the successive lens members I, II and III, and also there is given the equivalent focal length $-F(V)$ of the negative corrector lens V, the minus (−) sign signifying negative focal length. Furthermore in the Table I is given the axial thicknesses $t_1$ to $t_4$, in terms of F, relating to the successive lens elements I, II, IIIa and IIIb, as well as the values, in terms of F, for the axial airspaces $S_1$ to $S_4$ surrounding said elements, and the focal lengths $F(IIIa)$ and $-F(IIIb)$ are of the elements IIIa and IIIb respectively.

TABLE I

.99F < $F(I)$ < 1.06F
1.28F < $F(II)$ < 1.38F
3.95F < $F(III)$ < 4.20F
1.49F < $F(V)$ < 1.60F
$F(IIIa)/-F(IIIb) = .88$ substantially
.27F < $t_1$ < .29F
.11F < $t_2$ < .14F
.16F < $t_3$ < .18F
.08F < $t_4$ < .10F
.16F < $S_1$ < .17F
1.15F < $S_2$ < 1.18F
.03F < $S_3$ < .04F
.24F < $S_4$ < .27F The symbol F hereabove represents the equivalent focal length of the entire objective lens system consisting of the lenses I, II, III and V.

In Table II herebelow are given the ranges of values for the radii of the successive lens surfaces which are designated $-R_1$ to $R_7$ of the lens elements I, II, IIIa and IIIb, the minus (−) sign used with certain of these values meaning that such a surface is curved concavely with reference to the entrant rays. Also in Table II are given the ranges of absolute values for the refractive indices $n_D(I)$, $n_D(II)$, $n_D(IIIa)$, and $(n_D IIIb)$ and Abbe numbers $\nu(I)$, $\nu(II)$, $\nu(IIIa)$, and $\nu(IIIb)$ related to the aforesaid lens elements.

TABLE II

.4223F < $-R_1$ < .4261F
.3156F < $-R_2$ < .3162F
1.8812F < $R_3$ < 1.8909F
1.0446F < $-R_4$ < 1.0475F
.7780F < $R_5$ < .7800F
.7780F < $-R_6$ < .7800F
3.8221F < $R_7$ < 3.8866F
1.611 < $n_D(I)$ < 1.614
1.513 < $n_D(II)$ < 1.515
1.513 < $n_D(IIIa)$ < 1.515
1.719 < $n_D(IIIb)$ < 1.723
58 < $\nu(I)$ < 60.0
69.0 < $\nu(II)$ < 72.0
69.0 < $\nu(IIIa)$ < 72.0
29.0 < $\nu(IIIb)$ < 30.5

More specifically, the values of all of the above mentioned construction parameters for one typical semi-objective 10 and its corrector lens V are given substantially, in terms of F, in the Table III and Table IV herebelow wherein the designations remain the same.

TABLE III

| | |
|---|---|
| $F(I) = 1.020F$ | $t_2 = .123F$ |
| $F(II) = 1.328F$ | $t_3 = .172F$ |
| $F(III) = 4.075F$ | $t_4 = .093F$ |
| $F(IIIa) = .787F$ | $S_1 = .167F$ |
| $F(IIIb) = .891F$ | $S_2 = 1.162F$ |
| $F(V) = 1.54F$ | $S_3 = .035F$ |
| $t_1 = .279F$ | $S_4 = .254F$ |

Absolute values

| | |
|---|---|
| $n_D(I) = 1.6120$ | $\nu(I) = 59.5$ |
| $n_D(II) = 1.5140$ | $\nu(II) = 70.20$ |
| $n_D(IIIa) = 1.5140$ | $\nu(IIIa) = 70.20$ |
| $n_D(IIIb) = 1.7213$ | $\nu(IIIb) = 29.30$ |

TABLE IV

| | |
|---|---|
| $-R_1 = .424F$ | $t_2 = .123F$ |
| $-R_2 = .315F$ | $t_3 = .172F$ |
| $R_3 = 1.886F$ | $t_4 = .093F$ |
| $-R_4 = 1.046F$ | $S_1 = .167F$ |
| $R_5 = .779F$ | $S_2 = 1.162F$ |
| $-R_6 = .779F$ | $S_3 = .035F$ |
| $R_7 = 3.868F$ | $S_4 = .254F$ |
| $t_1 = .279F$ | |

Absolute values

| | |
|---|---|
| $n_D(I) = 1.6120$ | $\nu(I) = 59.5$ |
| $n_D(II) = 1.5140$ | $\nu(II) = 70.20$ |
| $n_D(IIIa) = 1.5140$ | $\nu(IIIa) = 70.20$ |
| $n_D(IIIb) = 1.7213$ | $\nu(IIIb) = 29.30$ |

It will be seen in the foregoing disclosure that a semi-objective is provided having an improved flatness of field and aberration condition when combined with the field flattening lens V in satisfaction of the stated objects of the present invention. Although only a single form of the invention has been shown and described in detail, other forms are possible and changes may be made in the form and detailed structure of the lens parts thereof without departing from the spirit of the invention.

I claim:

1. A microscope semi-objective which is used in tandem with a negative field flattening lens having per se substantially 5× magnification, said negative lens being interchangeably used with a set of other semi-objectives of different powers which are all parfocalized with respect to each other, said negative lens and semi-objective being designed to be complementary to each other in producing a total image magnification of 10.0× and a numerical aperture of substantially 0.25, the equivalent focal length of the combination of semi-objective and negative field flattening lens being designated F and the equivalent focal length of said field flattening lens being designated F(V), said semi-objective comprising:

a front positive meniscus lens member designated I which is concave toward a specimen plane and is spaced therefrom at an axial distance $S_1$, the axial thickness of said lens being designated $t_1$, a double convex lens member which is designated II and is spaced at a large axial distance $S_2$ rearwardly from member I, the axial thickness thereof being designated $t_2$, and a doublet positive meniscus lens designated III which is spaced at an axial distance $S_3$ from member II and is composed of a front double convex lens element IIIa which lies in full contact with a rear double concave lens element IIIb, the respective axial thicknesses of said elements being designated $t_3$ and $t_4$, the ranges of values for the constructional parameters for said semi-objective being given in the table herebelow wherein F(I), F(II), F(III), F(IIIa) and —F(IIIb) designate the equivalent focal lengths of the successive lens elements above named, and the minus (—) sign means negative focal length, $S_1$ to $S_4$ designate the airspaces between specimen plane, lens elements, and said negative field flattening lens, together with the values for the aforementioned lens thicknesses $t_1$ to $t_4$, $$.99F < F(I) < 1.06F$$
$$128F < F(II) < 1.38F$$
$$3.95F < F(III) < 4.20F$$
$$1.49F < F(V) < 1.60F$$
$$F(IIIa)/-F(IIIb) = .88 \text{ substantially}$$
$$.27F < t_1 < .29F$$
$$.11F < t_2 < .14F$$
$$.16F < t_3 < .18F$$
$$.08F < t_4 < .10F$$
$$.16F < S_1 < .17F$$
$$1.15F < S_2 < 1.18F$$
$$.03F < S_3 < .04F$$
$$.24F < S_4 < .27F$$

2. A microscope semi-objective which is used in tandem with a negative field flattening lens having per se substantially 5× magnification, said negative lens being interchangeably used with other semi-objectives which are all parfocalized at a common objective shoulder plane, said negative lens and semi-objective being designed to be complementary to each other in producing a total image magnification of 10.0× and a numerical aperture of substantially 0.25, the equivalent focal length of the combination of semi-objective and negative lens being designated F and the equivalent focal length of said field flattening lens being designated F(V), said semi-objective comprising a front positive meniscus lens member designated I which is concave toward a specimen plane and is spaced therefrom at an axial distance $S_1$, the axial thickness of said lens being designated $t_1$, a double convex lens member which is designated II and is spaced at a large axial distance $S_2$ rearwardly from member I, the axial thickness thereof being designated $t_2$, and a doublet positive meniscus lens designated III which is spaced at an axial distance $S_3$ from member II and is composed of a front double convex lens element IIIa which lies in full contact with a rear double concave lens element IIIb, the respective axial thicknesses of said elements being designated $t_3$ and $t_4$, the ranges of values for the constructional parameters for said semi-objective being given in the table herebelow wherein F(I), F(II), F(III), F(IIIa) and —F(IIIb) designate the equivalent focal lengths of the successive lens elements above named, and the minus (—) sign means negative focal length, $S_1$ to $S_4$ designate the airspaces between specimen plane, and the successive lens elements, and said negative field flattening lens, together with the values for the aforementioned lens thicknesses, $$.99F < F(I) < 1.06F$$
$$1.28F < F(II) < 1.38F$$
$$3.95F < F(III) < 4.20F$$
$$1.49F < F(V) < 1.60F$$
$$F(IIIa)/-F(IIIb) = .88 \text{ substantially}$$
$$.27F < t_1 < .29F$$
$$.11F < t_2 < .14F$$
$$.16F < t_3 < .18F$$
$$.08F < t_4 < .10F$$
$$.16F < S_1 < .17F$$
$$1.15F < S_2 < 1.18F$$
$$.03F < S_4 < .04F$$
$$.24F < S_4 < .27F$$

the ranges of absolute values being designated $n_D(I)$, $n_D(II)$, $n_D(IIIa)$, and $n_D(IIIb)$ for the refractive index of the glass used in the respective lens elements I, II, IIIa, and IIIb, and the Abbe numbers being designated $\nu$ in a similar manner for said elements in the table herebelow, $$1.611 < n_D(I) < 1.614$$
$$1.513 < n_D(II) < 1.515$$
$$1.513 < n_D(IIIa) < 1.515$$
$$1.719 < n_D(IIIb) < 1.723$$
$$58.0 < \nu(I) < 60.0$$
$$69.0 < \nu(II) < 72.0$$
$$69.0 < \nu(IIIa) < 72.0$$
$$29.0 < \nu(IIIb) < 30.5$$

3. A microscope semi-objective which is used in tandem with a negative field flattening lens having substantially 5× magnification per se which is interchangeably used with other semi-objectives which are all parfocalized with the objective shoulder plane, said negative lens and semi-objective being designed to be complementary to each other in producing a total image magnification of 10.0× and a numerical aperture of substantially 0.25, the equivalent focal length of the combination of semi-objective and negative lens being designated F, said semi-objective comprising a front positive meniscus lens member designated I which is concave toward a specimen plane and is spaced therefrom at an axial distance $S_1$, the axial thickness of said lens being designated $t_1$, a double convex lens member which is designated II and is spaced at a large axial distance $S_2$ rearwardly from member I, the axial thickness thereof being designated $t_2$, and a doublet positive meniscus lens designated III which is spaced at an axial distance $S_3$ from member II and is composed of a front double convex lens element IIIa which lies in full contact with a rear double concave lens element IIIb, the respective axial thicknesses of said elements being designated $t_3$ and $t_4$, the ranges of values for the constructional parameters for said semi-objective being given in the table herebelow wherein $-R_1$ to $R_7$ designates the radii of the successive lens surfaces of the lens elements, the minus (—) sign denoting that such a designated surface is concave toward the specimen plane, and the designations $t_1$ to $t_4$ and $S_1$ to $S_4$ have the aforementioned definitions, $$.4223F < -R_1 < .4261F$$
$$.3156F < -R_2 < .3162F$$
$$1.8812F < R_3 < 1.8909F$$
$$1.0446F < -R_4 < 1.0475F$$
$$.7780F < R_5 < .7800F$$
$$.7780F < -R_6 < .7800F$$
$$3.8221F < R_7 < 3.8866F$$
$$.27F < t_1 < .29F$$
$$.11F < t_2 < .14F$$
$$.16F < t_3 < .18F$$

$.08F < t_4 < .10F$
$.16F < S_1 < .17F$
$1.15F < S_2 < 1.18F$
$.03F < S_3 < .04F$
$.24F < S_4 < .27F$

4. A microscope semi-objective which is used in tandem with a negative field flattening lens having substantially 5× magnification per se which is interchangeably used with other semi-objectives which are all parfocalized with the objective shoulder plane, said negative lens and semi-objective being designed to be complementary to each other in producing a total image magnification of 10.0× and a numerical aperture of substantially 0.25, the equivalent focal length of the combination of semi-objective and negative lens being designated F, said semi-objective comprising a front positive meniscus lens member designated I which is concave toward a specimen plane and is spaced therefrom at an axial distance $S_1$, the axial thickness of said lens being designated $t_1$, a double convex lens member which is designated II and is spaced at a large axial distance $S_2$ rearwardly from member I, the axial thickness thereof being designated $t_2$, and a doublet positive meniscus lens designated III which is spaced at an axial distance $S_3$ from member II and is composed of a front double convex lens element IIIa which lies in full contact with a rear double concave lens element IIIb, the respective axial thicknesses of said elements being designated $t_3$ and $t_4$, the ranges of values for the constructional parameters for said semi-objective being given in the table herebelow wherein $-R_1$ to $R_7$ designate the radii of the successive lens surfaces of the lens elements, the minus (—) sign denoting that such a designated surface is concave toward the specimen plane, and the designations $t_1$ to $t_4$ and $S_1$ to $S_4$ have the aforementioned definitions, $.4223F < -R_1 < .4261F$
$.3156F < -R_2 < .3162F$
$1.8812F < R_3 < 1.8909F$
$1.0446F < -R_4 < 1.0475F$
$.7780F < R_5 < .7800F$
$.7780F < -R_6 < .7800F$
$3.8221F < R_7 < 3.8866F$
$.27F < t_1 < .29F$
$.11F < t_2 < .14F$
$.16F < t_3 < .18F$
$.08F < t_4 < .10F$
$.16F < S_1 < .17F$
$1.15F < S_2 < 1.18F$
$.03F < S_3 < .04F$
$.24F < S_4 < .27F$ and wherein the ranges of absolute values for the glass from which said lens elements are made are given under the designations in the table herebelow wherein the ranges of absolute values for the refractive index $n_D$ and Abbe number $\nu$ of the glass from which said lens elements are formed are given in the table herebelow as follows:

$1.611 < n_D(I) < 1.614$
$1.513 < n_D(II) < 1.515$
$1.513 < n_D(IIIa) < 1.515$
$1.719 < n_D(IIIb) < 1.723$
$58.0 < \nu(I) < 60.0$
$69.0 < \nu(II) < 72.0$
$69.0 < \nu(IIIa) < 72.0$
$29.0 < \nu(IIIb) < 30.5$

5. A microscope semi-objective which is used in tandem with a negative field flattening lens having substantially 5× magnification per se which is interchangeably used with other semi-objectives which are all parfocalized with the objective shoulder plane, said negative lens and semi-objective being designed to be complementary to each other in producing a total image magnification of 10.0× and a numerical aperture of substantially 0.25, the equivalent focal length of the combination of semi-objective and negative lens being designated F and the equivalent focal length of said field flattening lens being designated F(V), said semi-objective comprising a front positive meniscus lens member designated I which is concave toward a specimen plane and is spaced therefrom at an axial distance $S_1$, the axial thickness of said lens being designated $t_1$, a double convex lens member which is designated II and is spaced at a large axial distance $S_2$ rearwardly from member I, the axial thickness thereof being designated $t_2$, and a doublet positive meniscus lens designated III which is spaced at an axial distance $S_3$ from member II and is composed of a front double convex lens element IIIa which lies in full contact with a rear double concave lens element IIIb, the respective axial thicknesses of said elements being designated $t_3$ and $t_4$, the specific values for the constructional parameters for said semi-objective being given in the table herebelow wherein F(I), F(II), F(III), F(IIIa) and $-F(IIIb)$ designate the equivalent focal lengths of the successive lens elements above named, and the minus (—) sign means negative focal length, together with the aforesaid airspaces $S_1$ to $S_4$, axial lens thicknesses $t_1$ to $t_4$ and the refractive indices $n_D$ and Abbe numbers $\nu$ which relate to the glasses from which said elements are made, $F(I) = 1.020F$  $\qquad t_3 = .172F$
$F(II) = 1.328F$  $\qquad t_4 = .093F$
$F(III) = 4.075F$  $\qquad S_1 = .167F$
$F(IIIa) = .787F$  $\qquad S_2 = 1.162F$
$t_1 = .279F$  $\qquad S_3 = .035F$
$t_2 = .123F$  $\qquad S_4 = .254F$ Absolute values $n_D(I) = 1.6120$  $\qquad \nu(I) = 59.50$
$n_D(II) = 1.5140$  $\qquad \nu(II) = 70.20$
$n_D(IIIa) = 1.5140$  $\qquad \nu(IIIa) = 70.20$
$n_D(IIIb) = 1.7213$  $\qquad \nu(IIIb) = 29.30$ 6. A microscope semi-objective which is used in tandem with a negative field flattening lens having substantially 5× magnification per se which is interchangeably used with other semi-objectives which are all parfocalized with the objective shoulder plane, said negative lens and semi-objective being designed to be complementary to each other in producing a total image magnification of 10.0× and a numerical aperture of substantially 0.25, the equivalent focal length of the combiantion of semi-objective and negative lens being designated F, said semi-objective comprising a front positive meniscus lens member designated I which is concave toward a specimen plane and is spaced therefrom at an axial distance $S_1$, the axial thickness of said lens being designated $t_1$, a double convex lens member which is designated II and is spaced at a large axial distance $S_2$ rearwardly from member I, the axial thickness thereof being designated $t_2$, and a doublet positive meniscus lens designated III which is spaced at an axial distance $S_3$ from member II and is composed of a front double convex lens element IIIa which lies in full contact with a rear double concave lens element IIIb, the respective axial thicknesses of said elements being designated $t_3$ and $t_4$, the specific values for the constructional parameters for said semi-objective being given in the table wherein $-R_1$ to $R_7$ designate the radii of the successive lens surfaces of the lens elements, the minus (−) sign denoting that such a designated surface is concave toward the specimen plane, wherein furthermore the specific values are given for $t_1$ to $t_4$, $S_1$ to $S_4$ as well as the absolute values for the refractive indices $n_D$ and Abbe numbers $\nu$ for the glasses from which the lens elements are made, $-R_1 = .424F$
$-R_2 = .315F$
$R_3 = 1.886F$
$-R_4 = 1.046F$
$R_5 = .779F$
$-R_6 = .779F$
$R_7 = 3.868F$
$t_1 = .279F$
$S_2 = 1.162F$
$S_3 = .035F$
$S_4 = .254F$
$n_D(I) = 1.6120$
$n_D(II) = 1.5140$
$n_D(IIIa) = 1.5140$
$n_D(IIIb) = 1.7200$
$\nu(I) = 59.50$
$t_2 = .123F$
$t_3 = .172F$
$t_4 = .093F$
$S_1 = .167F$
$\nu(II) = 70.20$
$\nu(IIIa) = 70.20$
$\nu(IIIb) = 29.30$

References Cited

UNITED STATES PATENTS 3,399,017  8/1968  Judd _____ 350—177 X

DAVID SCHONBERG, Primary Examiner
PAUL A. SACHER, Assistant Examiner

U.S. Cl. X.R.
350—224, 229

PO-1050
(5/69)

UNITED STATES PATENT OFFICE
CERTIFICATE OF CORRECTION

Patent No. 3,476,462　　　　　　　　　Dated Nov. 4, 1969

Inventor(s)　　James R. Benford

It is certified that error appears in the above-identified patent and that said Letters Patent are hereby corrected as shown below:

Col. 5, line 29, change "128F" to -- 1.28F --

SIGNED AND
SEALED
NOV 3 1970

(SEAL)
Attest:

Edward M. Fletcher, Jr.
Attesting Officer

WILLIAM E. SCHUYLER, JR.
Commissioner of Patents